United States Patent
Liu

(10) Patent No.: US 8,295,476 B2
(45) Date of Patent: Oct. 23, 2012

(54) ECHO CANCELLER AND ECHO CANCELLATION METHOD

(75) Inventor: Tsu-Chun Liu, Hsin-Chu (TW)

(73) Assignee: IC Plus Corp., Hsin-Chu (TW)

( * ) Notice: Subject to any disclaimer, the term of this patent is extended or adjusted under 35 U.S.C. 154(b) by 1030 days.

(21) Appl. No.: 12/259,796

(22) Filed: Oct. 28, 2008

(65) Prior Publication Data

US 2010/0048137 A1    Feb. 25, 2010

(30) Foreign Application Priority Data

Aug. 20, 2008    (TW) .............................. 97131812 A

(51) Int. Cl.
  *H04M 9/08*    (2006.01)
(52) U.S. Cl. ................................. 379/406.08
(58) Field of Classification Search .............. 379/406.08
See application file for complete search history.

(56) References Cited

U.S. PATENT DOCUMENTS

| | | | | |
|---|---|---|---|---|
| 4,805,215 | A | * | 2/1989 | Miller ...................... 379/406.08 |
| 6,907,128 | B2 | * | 6/2005 | Kimura et al. ................ 381/71.1 |
| 2004/0260738 | A1 | * | 12/2004 | Kablotsky et al. ............ 708/322 |

* cited by examiner

*Primary Examiner* — Alexander Jamal
(74) *Attorney, Agent, or Firm* — J.C. Patents

(57) ABSTRACT

An echo canceller and an echo cancellation method are provided. In the echo cancellation method, a transmitting data sequence is received, and M taps are provided accordingly. In addition, the M taps are received, and N taps are output according to an echo distribution information, in which the M and N are natural numbers, and M>N. Besides, the N taps are multiplied by N tap coefficients respectively to generate N products. Further, the N products are summed up to generate an echo cancellation signal. Thereby, the cost of the echo cancellation is decreased.

9 Claims, 5 Drawing Sheets

ECHO CANCELLER AND ECHO CANCELLATION METHOD

CROSS-REFERENCE TO RELATED APPLICATION

This application claims the priority benefit of Taiwan application serial no. 97131812, filed on Aug. 20, 2008. The entirety of the above-mentioned patent application is hereby incorporated by reference herein and made a part of specification.

BACKGROUND OF THE INVENTION

1. Field of the Invention

The present invention generally relates to a transceiver device, in particular, to an echo cancellation technology of a transceiver device.

2. Description of Related Art

In communication systems, transceivers are usually employed for signal transmission. The transceiver is composed of a transmitter (TX) and a receiver (RX). FIG. 1 is a schematic view of a conventional full-duplex transceiver. Referring to FIG. 1, a near-end transceiver 102 and a far-end transceiver 104 are full-duplex transceivers. That is to say, the near-end transceiver 102 and the far-end transceiver 104 are capable of performing bi-directional data transmission through a transmission line 114. In addition, the near-end transceiver 102 includes a TX 106, an RX 108, and a hybrid circuit 116. The far-end transceiver 104 includes a TX 110, an RX 112, and a hybrid circuit 118.

As for the near-end transceiver 102, the TX 106 transmits a signal through the transmission line 114 to the RX 112 in the far-end transceiver 104. However, when the TX 106 in the near-end transceiver 102 transmits a signal to the far-end transceiver 104, if impedance mismatching occurs between the transmission line 114 and the transceivers 102, 104, an echo signal 120 is generated. The echo signal 120 is transmitted back to the RX 108 in the near-end transceiver 102, and the RX 108 regards the echo signal 120 as an interference noise. Therefore, an echo canceller (EC) is required to cancel the echo signal 120.

FIG. 2 is a schematic view of a conventional EC. Together referring to FIGS. 1 and 2, the EC is generally an adaptive finite impulse response (FIR) filter. $(X_1, X_2, X_3, X_4, \ldots, X_M)$ is a transmitting data sequence of the EC. Delay units 202, 204, 206, 208, ..., 210 are used to delay the input of the transmitting data sequence $(X_1, X_2, X_3, X_4, \ldots, X_M)$. $C_1, C_2, C_3, C_4, \ldots, C_M$ are tap coefficients. A multiplier 212 is employed to multiply a tap $X_0$ by a tap coefficient $C_0$, and it is the same with multipliers 214 to 220. Then, an adder 222 is adopted to sum up the above products for generating an echo cancellation signal $(Z_1, Z_2, Z_3, Z_4, \ldots, Z_M)$. The echo cancellation signal $(Z_1, Z_2, Z_3, Z_4, \ldots, Z_M)$ is used for cancelling the echo signal 120.

As the echo signal 120 is transmitted for a distance twice the length of the transmission line 114, in order to cancel the echo signal 120 that has passed by such a long distance, the conventional EC may adopt multipliers at a number corresponding to the transmitting data sequence $(X_1, X_2, X_3, X_4, \ldots, X_M)$ of the echo signal 120. Seen from the above, the conventional EC adopts a large number of multipliers, so that the cost is high and the total size of a chip is huge.

SUMMARY OF THE INVENTION

Accordingly, the present invention is directed to an echo canceller (EC), so as to reduce the cost of the echo cancellation.

The present invention is further directed to an echo cancellation method, so as to reduce the amount of data operation.

The present invention provides an EC, which includes a delay module, a selection connector, a multiplication module, and an adder. The delay module includes a plurality of delay units sequentially connected in series, for receiving a transmitting data sequence so as to provide M taps accordingly. The selection connector is coupled to the delay module, for receiving the M taps and outputting N taps according to an echo distribution information, in which M, N are natural numbers, and M>N. The multiplication module is coupled to the selection connector, for multiplying the N taps by corresponding N tap coefficients respectively to generate N products. The adder is coupled to the multiplication module, for summing up the N products to generate an echo cancellation signal.

In an embodiment of the present invention, the EC further includes an echo analysis unit. The echo analysis unit is coupled to the selection connector, for receiving at least one echo signal and generating a plurality of impulse responses accordingly. The echo analysis unit analyzes the strength of each impulse response, and selects N impulse responses with a strength higher than a preset value from the impulse responses, so as to generate the echo distribution information. In another embodiment, the EC further includes a least mean square (LMS) unit coupled to the echo analysis unit and the multiplication module, for generating the N tap coefficients according to the echo distribution information.

In an embodiment of the present invention, the selection connector includes a plurality of switching switches. In another embodiment, the selection connector is a multiplexer. In still another embodiment, each delay unit is a D flip-flop.

Further, the present invention provides an echo cancellation method. The method includes the steps of receiving a transmitting data sequence, and providing M taps accordingly; receiving the M taps, and outputting N taps according to an echo distribution information, in which M, N are natural numbers, and M>N; multiplying the N taps by corresponding N tap coefficients respectively to generate N products; and summing up the N products to generate an echo cancellation signal.

In the present invention, N taps are output from M taps according to an echo distribution information, and M>N. The N taps are then processed to generate an echo cancellation signal. Thereby, the amount of data operation is reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
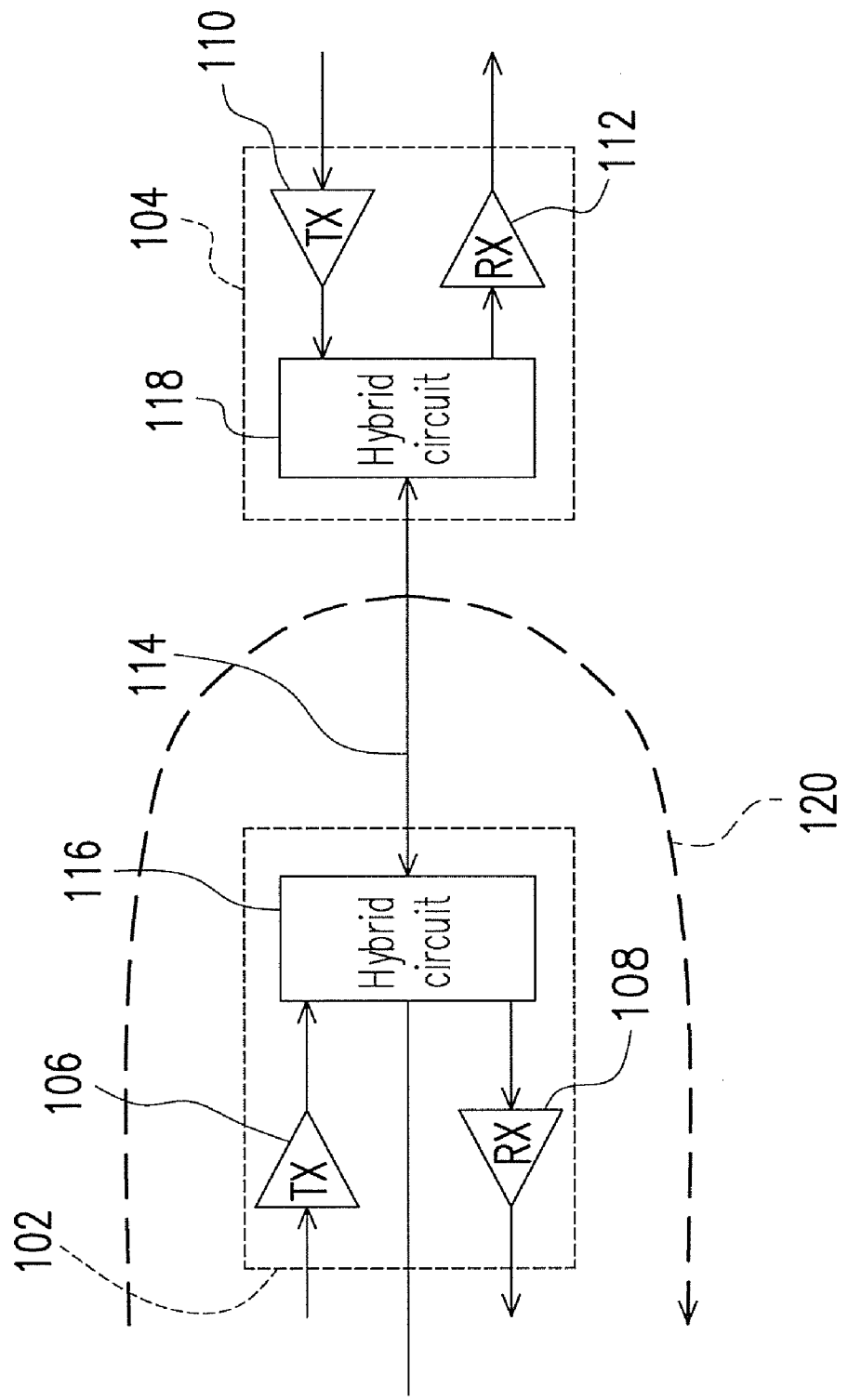
FIG. 1 is a schematic view of a conventional full-duplex transceiver.
Figure 2:
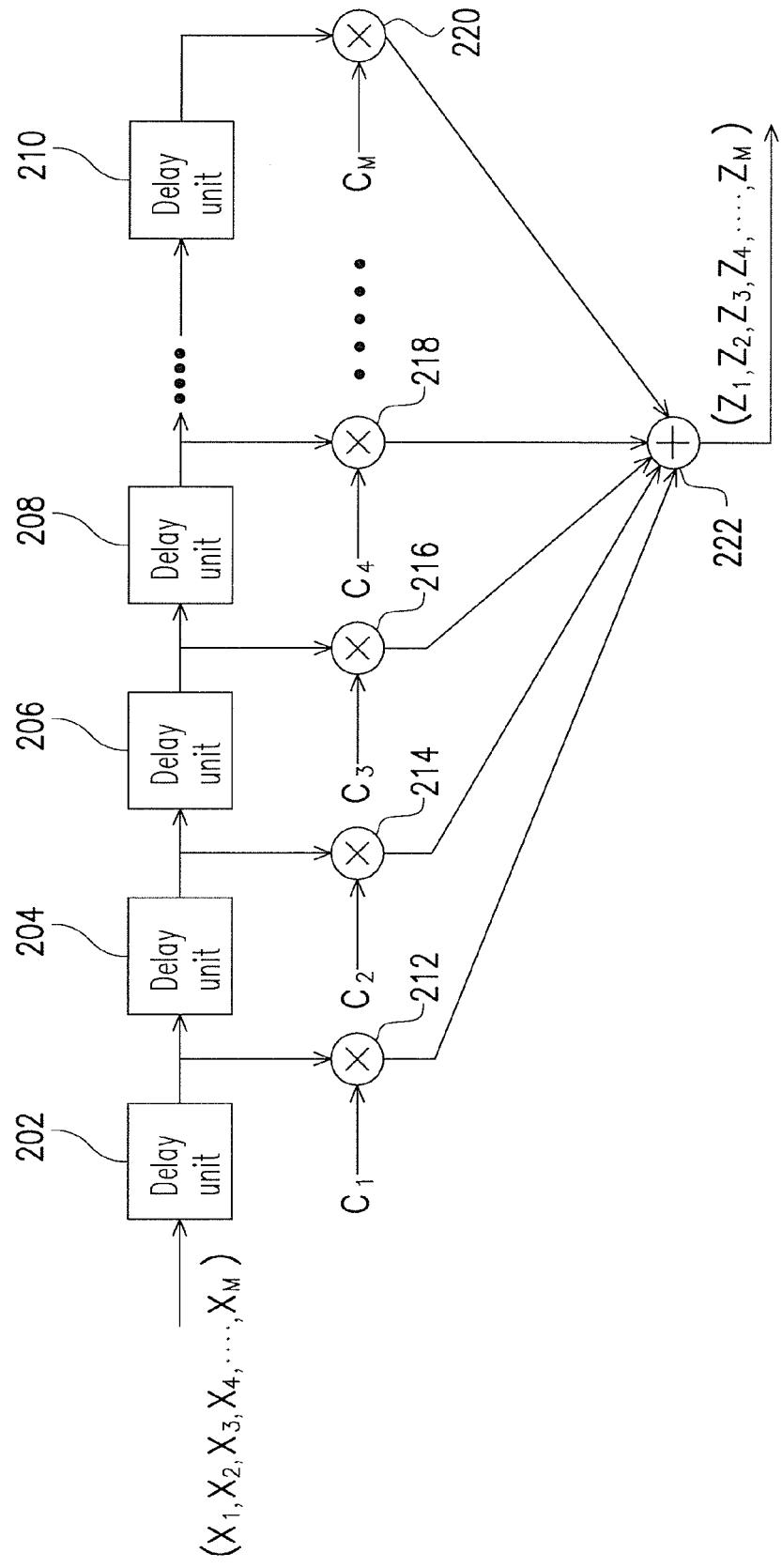
FIG. 2 is a schematic view of a conventional EC.

Reference will now be made in detail to the present embodiments of the invention, examples of which are illustrated in the accompanying drawings. Wherever possible, the same reference numbers are used in the drawings and the description to refer to the same or like parts.

In the prior art, an echo canceller (EC) requires plenty of multipliers, and thus the cost is high. Accordingly, an embodiment of the present invention provides an echo cancellation technology of a transceiver device, such that only a part of the taps is captured according to the echo distribution information for performing the echo cancellation. Thereby, the hardware cost of the EC is lowered, and further the amount of data operation is reduced. Details will be given below with the accompanying drawings.

Figure 3:
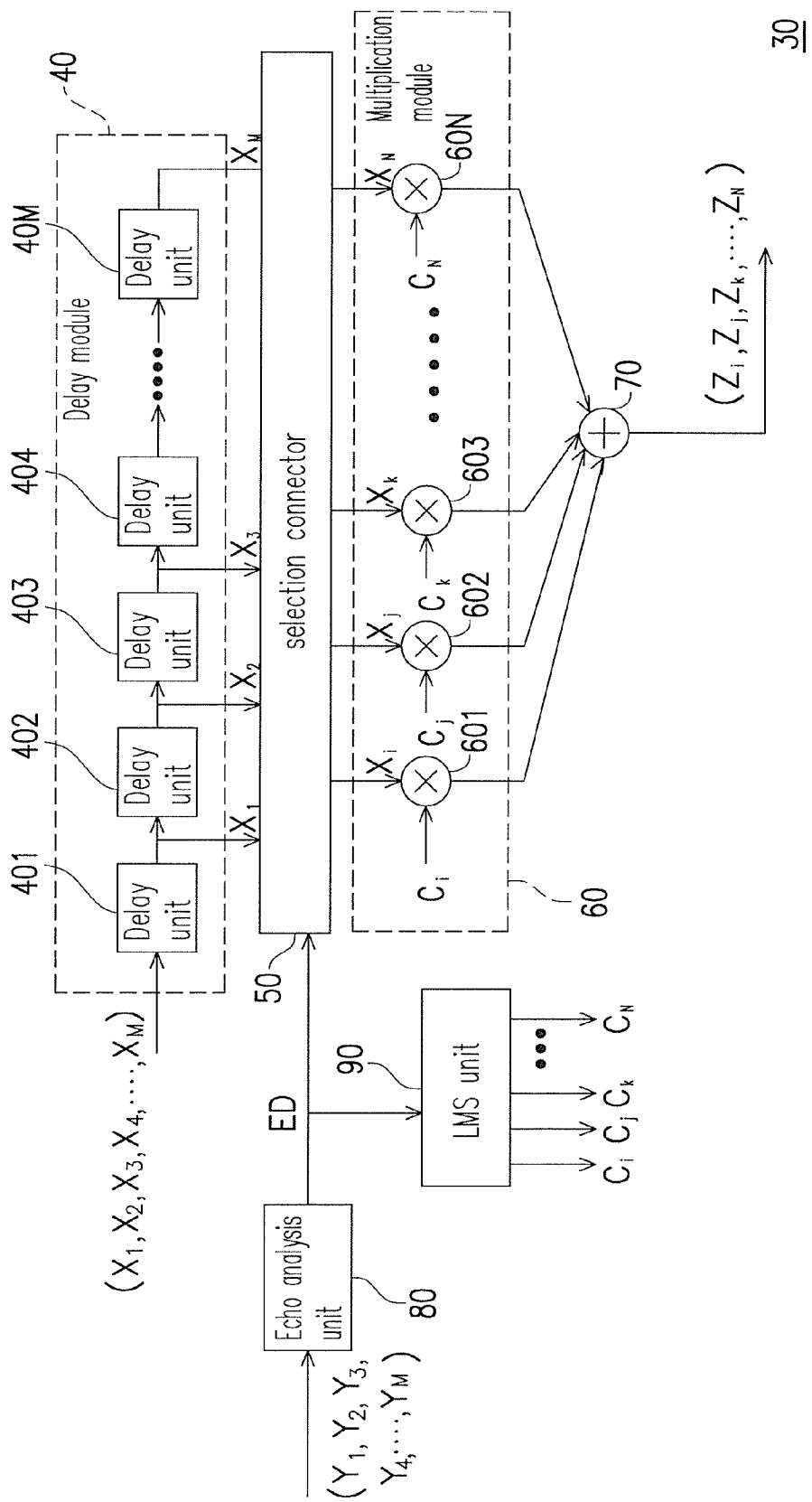
FIG. 3 is a schematic view of an EC applied in a transceiver device according to an embodiment of the present invention.

FIG. 3 is a schematic view of an EC applied in a transceiver device according to an embodiment of the present invention. Referring to FIG. 3, in this embodiment, the transceiver device (not shown) transmits data with a far-end device (not shown) in a full-duplex transmission mode. The far-end device is, for example, a far-end transceiver device. In order to reduce the interference of the echo signal on the transceiver device, an EC 30 is disposed in the transceiver device of this embodiment. The EC 30 includes a delay module 40, a selection connector 50, a multiplication module 60, an adder 70, an echo analysis unit 80, and a least mean square (LMS) unit 90. The delay module 40, for example, includes M delay units respectively represented by 401, 402, 403, ..., 40M. In this embodiment, the delay units 401 to 40M are, for example, implemented as D flip-flops. Further, the time delayed by the delay units 401 to 40M is, for example, 8 ns. The multiplication module 60, for example, includes N multipliers respectively represented by 601, 602, 603, ..., 60N, in which M, N are natural numbers, and M>N.

The delay module 40 receives a transmitting data sequence $(X_1, X_2, X_3, X_4, \ldots, X_M)$, and provides M taps accordingly. The M taps are, for example, $X_1, X_2, X_3, X_4, \ldots, X_M$. The echo analysis unit 80 generates an echo distribution information ED according to an echo signal $(Y_1, Y_2, Y_3, Y_4, \ldots, Y_M)$. The transmitting data sequence $(X_1, X_2, X_3, X_4, \ldots, X_M)$ may be a signal transmitted by the transceiver device to the far-end device. The echo signal $(Y_1, Y_2, Y_3, Y_4, \ldots, Y_M)$ is, for example, an echo signal derived from an impulse signal transmitted by the transceiver device to the far-end device. The selection connector 50 is coupled to the delay module 40 and the echo analysis unit 80. In this embodiment, the selection connector 50 is, for example, a multiplexer. The selection connector 50 receives the taps $X_1, X_2, X_3, X_4, \ldots, X_M$, and outputs N taps to the multipliers 601, 602, 603, ..., 60N of the multiplication module 60 according to the echo distribution information ED. The N taps are represented by $X_i, X_j, X_k, \ldots, X_N$.

Further, the LMS unit 90 is coupled to the echo distribution unit 80, for generating N tap coefficients, respectively $C_i, C_j, C_k, \ldots, C_N$, corresponding to the N taps according to the echo distribution information ED, and outputting the N tap coefficients respectively to the multipliers 601, 602, 603, ..., 60N. The multipliers 601, 602, 603, ..., 60N generate N products, respectively $Z_i, Z_j, Z_k, \ldots, Z_N$, according to the N taps and the N tap coefficients. The adder 70 is coupled to the multipliers 601, 602, 603, ..., 60N, for summing up the products $Z_i, Z_j, Z_k, \ldots, Z_N$ to generate an echo cancellation signal $(Z_i, Z_j, Z_k, \ldots, Z_N)$.

Figure 4:
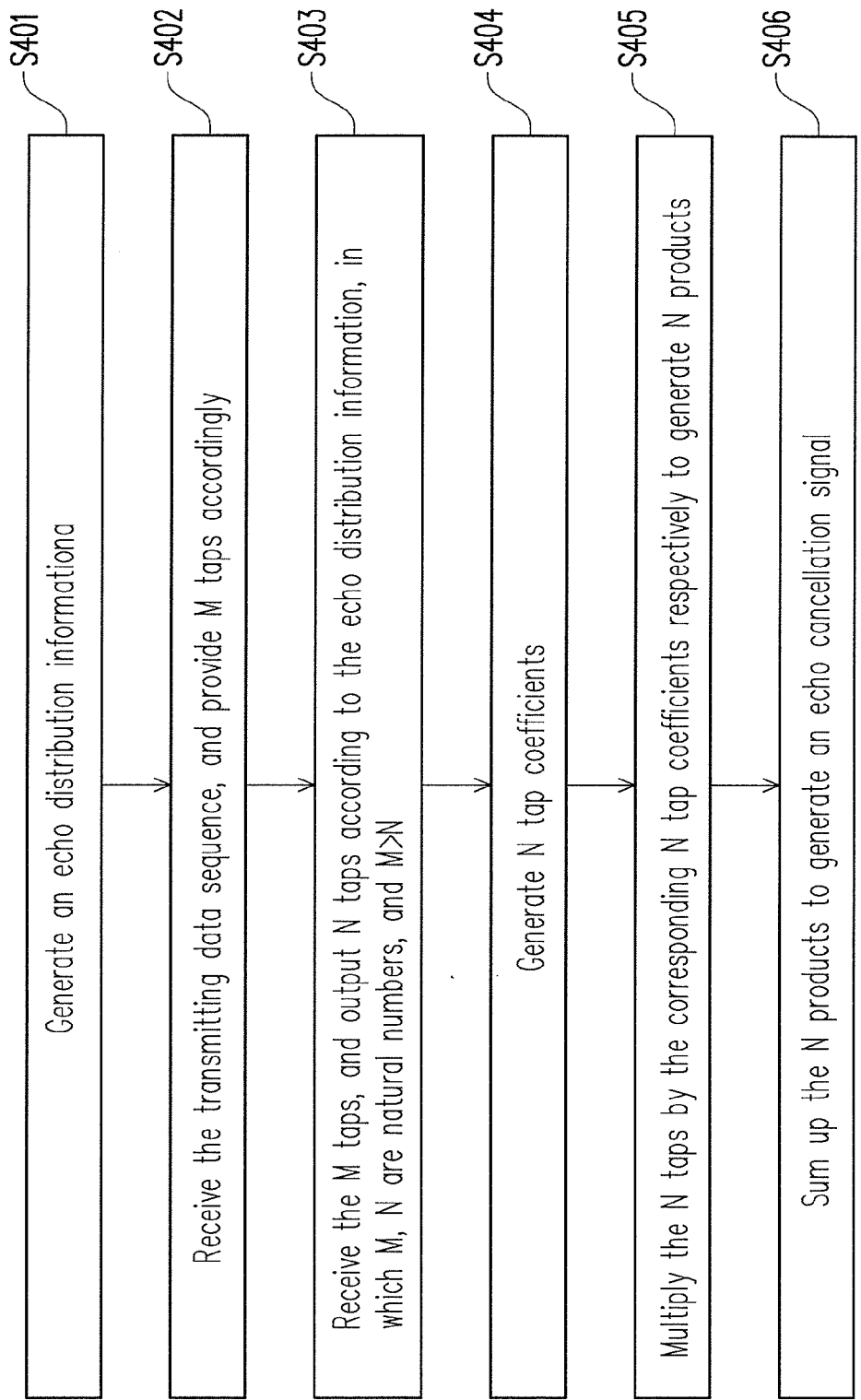
FIG. 4 is a flow chart of an echo cancellation method according to an embodiment of the present invention.
Figure 5:
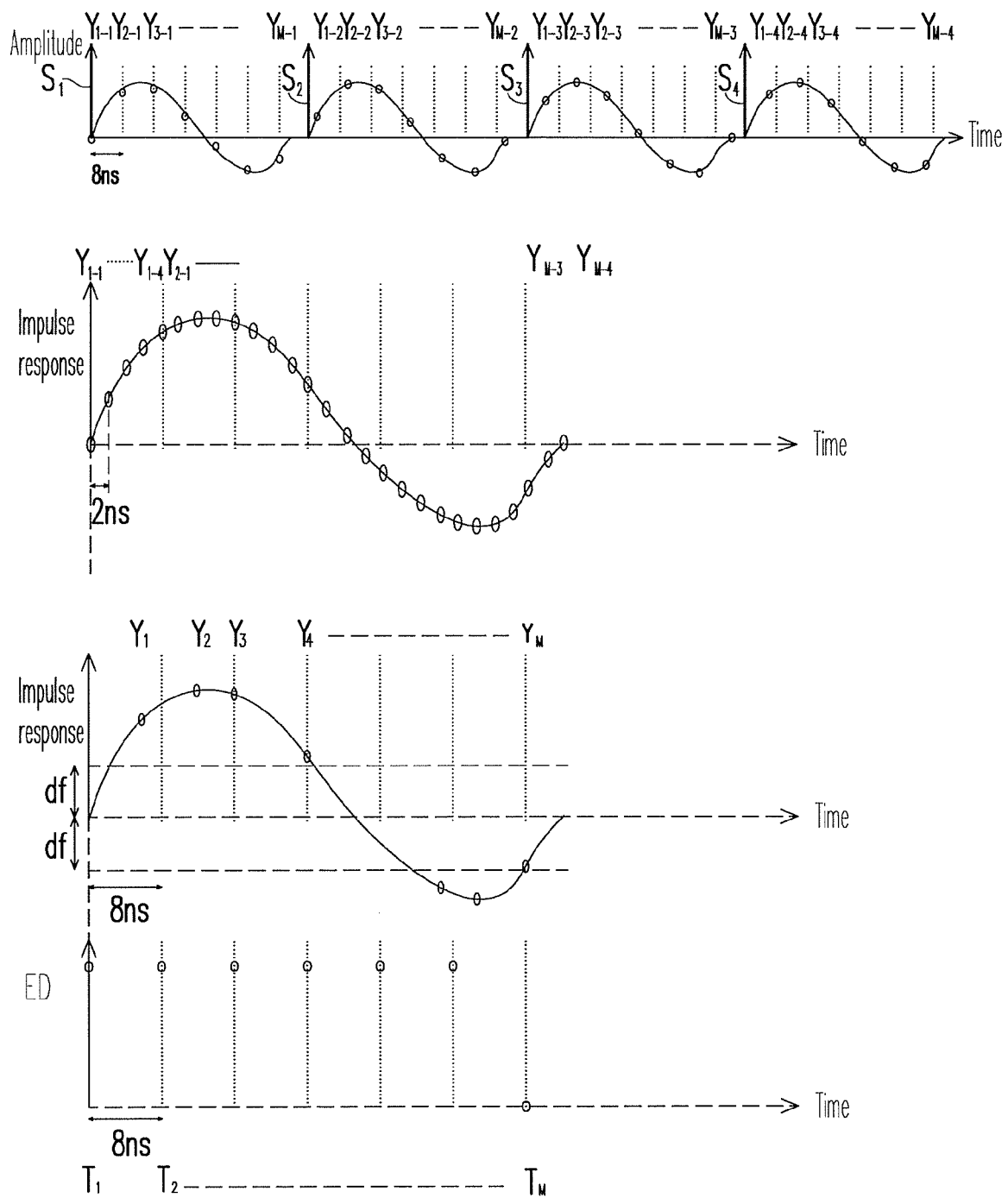
FIG. 5 is a schematic wave pattern of a data sequence and an echo distribution information according to an embodiment of the present invention.

FIG. 4 is a flow chart of an echo cancellation method according to an embodiment of the present invention. FIG. 5 is a schematic wave pattern of a data sequence and an echo distribution information according to an embodiment of the present invention. Together referring to FIGS. 3, 4, and 5, first in step S401, an echo distribution information ED is generated. In particular, when the transceiver device performs an auto negotiation with the far-end device, the transceiver device sends out an impulse signal to the far-end device, and receives an echo signal $(Y_1, Y_2, Y_3, Y_4, \ldots, Y_M)$ derived from the impulse signal.

Generally speaking, the transceiver device samples the echo signal $(Y_1, Y_2, Y_3, Y_4, \ldots, Y_M)$ with an analog-to-digital converter (ADC). Those skilled in the art should understand that, when the sampling period is too large, it is hard to precisely reflect the actual status of the echo signal, such that the strength (or amplitude) of the echo signal may be underestimated. Thereby, an embodiment directed to the sampling of an echo signal is given below as a reference for those skilled in the art.

In this embodiment, the sampling period of the ADC is assumed to be 8 ns. First, after the transceiver device sends out an impulse signal $S_1$, the ADC samples the echo signal at a sampling period of 8 ns, so as to obtain impulse responses $Y_{1-1}, Y_{2-1}, Y_{3-1}, \ldots, Y_{M-1}$. Next, the transceiver device sends out an impulse signal $S_2$ identical to the impulse signal $S_1$, and then the ADC samples the echo signal at a sampling period of 8 ns with 2 ns delay, so as to obtain impulse response $Y_{1-2}, Y_{2-2}, Y_{3-2}, \ldots, Y_{M-2}$. Afterward, the transceiver device sends out an impulse signal $S_3$ identical to the impulse signal $S_1$, and then the ADC samples the echo signal at a sampling period of 8 ns with 4 ns delay, so as to obtain impulse responses $Y_{1-3}, Y_{2-3}, Y_{3-3}, \ldots, Y_{M-3}$. Next, the transceiver device again sends out an impulse signal $S_4$ identical to the impulse signal $S_1$, and then the ADC samples the echo signal at a sampling period of 8 ns with 6 ns delay, so as to obtain impulse responses $Y_{1-4}, Y_{2-4}, Y_{3-4}, \ldots, Y_{M-4}$.

Thereafter, the above impulse responses are combined to obtain impulse responses $Y_{1-1}, Y_{1-2}, Y_{1-3}, Y_{1-4}, Y_{2-1}, Y_{2-2}, Y_{2-3}, Y_{2-4}, \ldots, Y_{M-1}, Y_{M-2}, Y_{M-3}, Y_{M-4}$ at a period of 2 ns. An impulse response with the largest absolute value of its strength is selected from $Y_{1-1}, Y_{1-2}, Y_{1-3}, Y_{1-4}$ as an impulse response $Y_1$. In this embodiment, the impulse response with the largest absolute value of its strength among $Y_{1-1}, Y_{1-2}, Y_{1-3}, Y_{1-4}$ is the impulse response $Y_{1-4}$, and thus the impulse response $Y_{1-4}$ is set as the impulse response $Y_1$. Next, an impulse response with the largest absolute value of its strength is selected from $Y_{2-1}, Y_{2-2}, Y_{2-3}, Y_{2-4}$ as an impulse response $Y_2$. In this embodiment, the impulse response with the largest absolute value of its strength among $Y_{2-1}, Y_{2-2}, Y_{2-3}, Y_{2-4}$ is the impulse response $Y_{2-3}$, and thus the impulse response $Y_{2-3}$ is set as the impulse response $Y_2$. The rest is deduced likewise to obtain the impulse responses $Y_1, Y_2, Y_3, Y_4, \ldots, Y_M$. The advantage of the above method is that the obtained impulse responses $Y_1, Y_2, Y_3, Y_4, \ldots, Y_M$ may effectively reflect the strength of the echo signal, so as to avoid underestimating the strength of the echo signal.

After obtaining the impulse responses $Y_1, Y_2, Y_3, Y_4, \ldots, Y_M$, the echo analysis unit 80 analyzes the strengths (or amplitudes) of the impulse responses $Y_1, Y_2, Y_3, Y_4, \ldots, Y_M$, and selects N impulse responses with a strength higher than a preset value df from the impulse responses $Y_1, Y_2, Y_3, Y_4, \ldots, Y_M$. An embodiment directed to the determination of the preset value df is given below as a reference for those skilled in the art. After analyzing the strengths of the impulse responses $Y_1, Y_2, Y_3, Y_4, \ldots, Y_M$, the echo analysis unit 80 arranges the impulse responses $Y_1, Y_2, Y_3, Y_4, \ldots, Y_M$ in a descending sequence according to the absolute value of the strength, and then sets the (N+1)th impulse response as the preset value df.

Afterward, it is determined whether the absolute value of the strength of each impulse response $Y_1, Y_2, Y_3, Y_4, \ldots, Y_M$ exceeds the preset value df. If yes, noises may easily occur at a corresponding position of the impulse response, and thus a corresponding position of the echo distribution information ED is set at a high level. On the contrary, if the strength of the impulse response does not exceed the preset value df, noises may not easily occur at a corresponding position of the impulse response, and thus a corresponding position of the echo distribution information ED is set at a low level. As such, the echo distribution information ED is generated, and the transceiver device may focus on taps with greater noises to implement echo cancellation according to the echo distribution information ED.

Next, in step S402, the delay module 40 receives the transmitting data sequence $(X_1, X_2, X_3, X_4, \ldots, X_M)$, and the delay units 401 to 40M of the delay module 40 provide M taps to the selection connector 50 according to the transmitting data sequence $(X_1, X_2, X_3, X_4, \ldots, X_M)$. The M taps are respectively $X_1, X_2, X_3, X_4, \ldots, X_M$.

Then, in step S403, the selection connector 50 receives the M taps, and outputs N taps to the multipliers 601 to 60N of the multiplication module 60 according to the echo distribution information ED. In detail, in this embodiment, the echo distribution information ED is at a high level at a time $T_1$, and the selection connector 50 outputs a corresponding tap $X_1$ to the multiplication module 60. Further, the echo distribution information ED is at a low level at a time $T_M$, and the selection connector 50 will not output a corresponding tap $X_2$ to the multiplication module 60. Likewise, the selection connector 50 may output N taps to the multipliers 601 to 60N of the multiplication module 60. In addition, the LMS unit 90 may generate N tap coefficients, respectively $C_i, C_j, C_k, \ldots, C_N$, corresponding to the N taps based on the echo distribution information ED by an LMS method (step S404).

Next, in step S405, the multiplication module 60 multiplies the N taps by the corresponding N tap coefficients respectively to generate N products. In particular, the multiplier 601 multiplies the tap $X_i$ by the tap coefficient $C_i$ to generate a product $Z_i$. The multiplier 602 multiplies the tap $X_j$ by the tap coefficient $C_j$ to generate a product $Z_j$. It is the same with the multipliers 603 to 60N, and the details will not be described herein again.

Finally, in step S406, the adder 70 sums up the N products $Z_i, Z_j, Z_k, \ldots, Z_N$ to generate an echo cancellation signal $(Z_i, Z_j, Z_k, \ldots, Z_N)$. The transceiver device then performs echo cancellation on taps with greater noises according to the echo cancellation signal $(Z_i, Z_j, Z_k, \ldots, Z_N)$. The transceiver device of this embodiment is compared with the conventional transceiver device below, so as to highlight the advantage of the echo cancellation technology of this embodiment.

In the prior art, the transceiver device provides M taps according to the transmitting data sequence, and thus M tap coefficients must be generated. Next, the transceiver device has to dispose M multipliers, so as to perform M times of multiplication on the M taps and the M tap coefficients for generating M products. After that, the transceiver device has to perform M times of summation, so as to sum up the M products for generating an echo cancellation signal.

However, in this embodiment, the selection connector 50 of the EC 30 outputs N taps with the greatest noises from the M taps according to the echo distribution information ED, and M>N. Thus, the EC 30 only has to generate N tap coefficients corresponding to the N taps. Compared with the prior art that M tap coefficients must be generated, the number of the tap coefficients that has to be generated in this embodiment is much lower, such that the amount of operation is significantly reduced.

Further, in this embodiment, the EC 30 only has to dispose N multipliers 601 to 60N, so as to perform N times of multiplication on the N taps and the N tap coefficients for generating N products. Compared with the prior art that M multipliers must be generated, the number of the multiplier that has to be generated in this embodiment is much lower, such that the cost and the size of a chip are decreased, and the required amount of multiplication is also significantly reduced.

In addition, in this embodiment, the EC 30 only needs to perform N times of summation, so as to sum up the N products for generating an echo cancellation signal. Compared with the prior art that M products must be summed up, this embodiment may also reduce the amount of summation.

It should be noted that, though the aforementioned embodiment provides a possible configuration of the EC and the echo cancellation method, those of ordinary skill in the art should understand that, the design of the EC and the echo cancellation method varies for different manufacturers, so the application of the present invention should not be limited herein. That is, it follows the spirit of the present invention as long as N taps are output from M taps according to an echo distribution information, in which M>N, and the N taps are then processed to generate an echo cancellation signal. Several other embodiments are given below for those of ordinary skill in the art to further appreciate the spirit of the present invention, and also implement the present invention accordingly.

Further referring to FIG. 3, the selection connector 50 in the above embodiment is a multiplexer, and the present invention is not limited thereto. For instance, the selection connector 50 may include a plurality of switching switches. The switching switches determine the coupling relations between the delay units 401 to 40M and the multipliers 601 to 60N according to the echo distribution information ED. In this manner, a similar effect as the above embodiment may also be achieved.

Moreover, in the above embodiment, the selection connector 50 outputs N taps from the M taps according to the echo distribution information ED, and the present invention is not limited thereto. In other embodiments, the M taps are divided into R groups, and the selection connector 50 selects S groups with the greatest noises from the R groups according to the echo distribution information ED, so as to generate an echo cancellation signal, in which R, S are natural numbers, and M>R>S. In this manner, a similar effect as the above embodiment can be achieved.

Further referring to FIG. 5, in the above embodiment, the echo distribution information ED is generated by the echo signal derived from the impulse signal, and the present invention is not limited thereto. Those skilled in the art may obtain the echo distribution information ED by other means. For example, several groups of echo distribution information are preset in the EC, and the information is appropriately selected according to different application environments. In this manner, a similar effect as the above embodiment can be achieved.

In addition, as different transmission lines have specified characteristic impedances, those skilled in the art may determine the echo distribution information ED according to information such as the length and type of the transmission line. For example, the echo signals can be classified into near-end echo signals and far-end echo signals. A longer length of the transmission line may result in a greater time difference between the near-end echo signal and the far-end echo signal received by the transceiver device, and thus resulting in a smaller strength of the far-end echo signal. Besides, the EC can be preset according to the echo distribution information ED. In particular, $N_1$ taps and $N_2$ taps are output from the M taps according to the echo distribution information ED. The $N_1$ taps and the $N_2$ taps are respectively corresponding to the near-end echo signal and the far-end echo signal. Afterward, an echo cancellation procedure is performed according to the $N_1$ and $N_2$ taps (referring to the aforementioned embodiment). In this manner, the near-end echo signal and the far-end echo signal may be effectively cancelled, without affecting the receiving quality of the transceiver device, and a similar effect as the above embodiment may also be achieved.

In view of the above, the present invention outputs N taps from M taps according to an echo distribution information, and M>N. Then, the N taps are processed to generate an echo cancellation signal. Thus, the amount of data operation is reduced. Further, the embodiment of the present invention at least achieves the following advantages:

1. Compared with the prior art that M multipliers must be provided, the embodiment of the present invention may significantly reduce the number of the multiplier, such that the cost and the size of a chip are decreased, and the required amount of multiplication is also greatly reduced.

2. As the number of the multiplier is reduced, the required quantity of the tap coefficient is also decreased so as to lower down the amount of operation.

3. As the number of the multiplier is reduced, the required amount of multiplication is also reduced accordingly.

4. As the number of the products obtained by the multiplication module is reduced, the amount of operation for summing up the products is much lower than the prior art.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An echo canceller (EC), comprising:
   a delay module, comprising a plurality of delay units sequentially connected in series, for receiving a transmitting data sequence so as to provide M taps accordingly;
   a selection connector, coupled to the delay module, for receiving the M taps and outputting N taps according to an echo distribution information, wherein M, N are natural numbers, and M>N;
   a multiplication module, coupled to the selection connector, for multiplying the N taps by corresponding N tap coefficients respectively to generate N products; and
   an adder, coupled to the multiplication module, for summing up the N products to generate an echo cancellation signal.

2. The EC according to claim 1, further comprising:
   an echo analysis unit, coupled to the selection connector, for receiving at least one echo signal and generating a plurality of impulse responses accordingly, wherein the echo analysis unit analyzes the strength of each impulse response, and selects N impulse responses with a strength higher than a preset value from the impulse responses, so as to generate the echo distribution information.

3. The EC according to claim 2, further comprising:
   a least mean square (LMS) unit, coupled to the echo analysis unit and the multiplication module, for generating the N tap coefficients according to the echo distribution information.

4. The EC according to claim 1, wherein the selection connector comprises a plurality of switching switches.

5. The EC according to claim 1, wherein the selection connector is a multiplexer.

6. The EC according to claim 1, wherein each delay unit is a D flip-flop.

7. An echo cancellation method, comprising:
   receiving a transmitting data sequence, and providing M taps accordingly;
   receiving the M taps, and outputting N taps according to an echo distribution information, wherein M, N are natural numbers, and M>N;
   multiplying the N taps by corresponding N tap coefficients respectively to generate N products; and
   summing up the N products to generate an echo cancellation signal.

8. The echo cancellation method according to claim 7, further comprising:
   receiving at least one echo signal, and generating a plurality of impulse responses accordingly; and
   selecting N impulse responses with a strength higher than a preset value from the impulse responses, so as to generate the echo distribution information.

9. The echo cancellation method according to claim 7, further comprising:
   generating the N tap coefficients according to the echo distribution information by a least mean square (LMS) method.

* * * * *